(12) United States Patent
Silver

(10) Patent No.: US 8,087,375 B2
(45) Date of Patent: Jan. 3, 2012

(54) MEASUREMENT DEVICE AND METHOD OF MEASURING FLUID LEVEL

(75) Inventor: C. Kevin Silver, Oradell, NJ (US)

(73) Assignee: L&M Associates Engineering Representatives, Incorporated, Elmwood Park, NJ (US)

(*) Notice: Subject to any disclaimer, the term of this patent is extended or adjusted under 35 U.S.C. 154(b) by 349 days.

(21) Appl. No.: 12/472,857

(22) Filed: May 27, 2009

(65) Prior Publication Data

US 2009/0293609 A1 Dec. 3, 2009

Related U.S. Application Data

(60) Provisional application No. 61/057,463, filed on May 30, 2008.

(51) Int. Cl.
*G01F 23/00* (2006.01)

(52) U.S. Cl. ...................... 116/227; 73/290 R

(58) Field of Classification Search ............... 73/290 R; 33/719, 722–731; 116/206, 227, 109; 340/612
See application file for complete search history.

(56) References Cited

U.S. PATENT DOCUMENTS

| | | | | |
|---|---|---|---|---|
| 2,932,969 A * | 4/1960 | Johnson | ...................... | 73/290 R |
| 3,745,659 A * | 7/1973 | Hsu | .................... | 33/720 |
| 4,266,429 A * | 5/1981 | Brovold | ...................... | 73/864.63 |
| 4,717,671 A * | 1/1988 | Melpolder | ....................... | 436/39 |
| 6,376,250 B1 * | 4/2002 | Mohtadi | ......................... | 436/40 |
| 7,938,002 B1 * | 5/2011 | Lazos | ........................ | 73/290 B |
| 2005/0268714 A1 * | 12/2005 | Watson | ...................... | 73/290 B |

* cited by examiner

*Primary Examiner* — Hezron E Williams
*Assistant Examiner* — Jamar Ray
(74) *Attorney, Agent, or Firm* — Myers Wolin, LLC

(57) ABSTRACT

A method of measuring a fluid level comprises providing a measuring device comprising a first material that changes appearance upon exposure to a first fluid, introducing the measuring device into a location comprising the first fluid and at least one other fluid, waiting for the first material to change appearance upon exposure to the first fluid, and withdrawing the measuring device from the location to determine the depth of the first fluid and the at least one other fluid. A measuring device for performing the method of measuring is also disclosed.

18 Claims, 2 Drawing Sheets

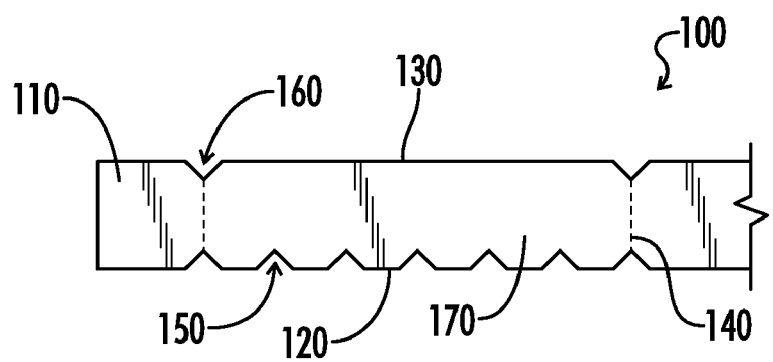
FIG. 1
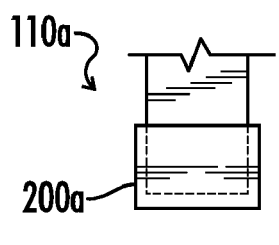
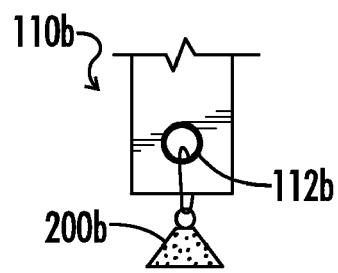
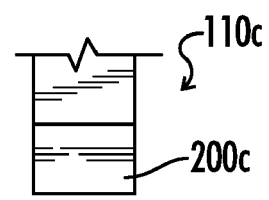
FIG. 2A   FIG. 2B   FIG. 2C

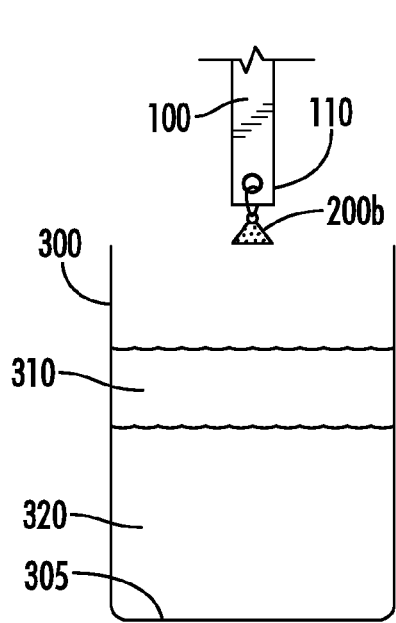 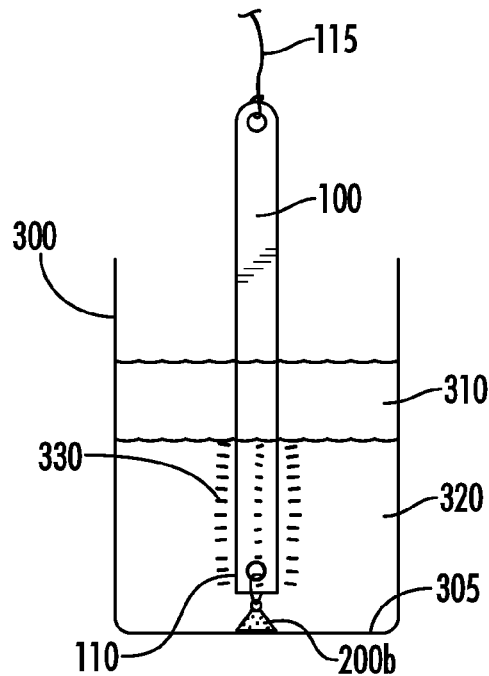
FIG. 3A　　　FIG. 3B
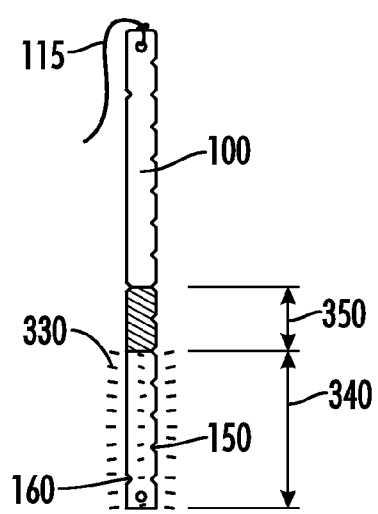 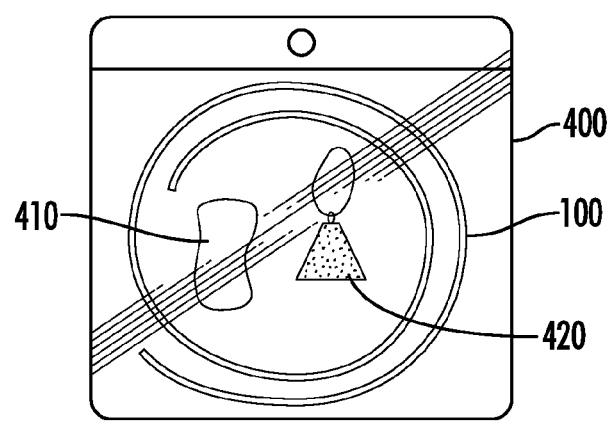
FIG. 3C　　　FIG. 4 ured States Patent US 8,087,375 B2

MEASUREMENT DEVICE AND METHOD OF MEASURING FLUID LEVEL

CROSS REFERENCE TO RELATED APPLICATIONS

This application claims the benefit of U.S. Application 61/057,463, filed May 30, 2008, the content of which is incorporated herein by reference.

FIELD OF THE INVENTION

The present invention relates to measurement devices in general, and more particularly to a strip device for measuring the level of fluid in a contained environment.

BACKGROUND

There is a need to provide a simple and accurate method for field personnel in electric utilities to measure the dielectric fluid that may have leaked from underground high voltage transmission systems. Older underground transmissions systems that require dielectric fluid for cooling are manufactured in section lengths of approximately one thousand to two thousand feet. Special high voltage splices are used to join the sections together. Often these underground cable systems are buried under city streets and access to the splices are through manholes leading to underground containment vaults.

Containment vaults are large, typically ten feet wide by fifteen feet long by ten feet deep. Transmission systems of this type have sophisticated leak detection and upon being alerted to the possibility of a leak all the cable vaults are visually inspected by removal of the manhole covers in the street and looking into the vault to determine if there is an oil leak. Vaults typically contain rainwater and the presence of oil of any depth is difficult for field personnel to determine quickly. A sixteenth of an inch of oil/dielectric fluid looks the same as a foot. A wide variety of techniques are employed by utility technicians to determine the presence and level of oil within an enclosed vault. A wrong "guesstimate" could lead to costly site remediation where none may be required or worse, not initiating the proper response where it is required.

Many methods of measurement were researched for the purpose including level measurement floats designed to float in fluids with various specific gravities. Other electronic products used in geological applications were investigated as well. Both seem clumsy and or expensive. There is a need, therefore, for a measuring device that is simple to use, inexpensive to use and manufacture, and accurate in its measurement.

SUMMARY

A method of measuring the depth of an aqueous liquid underlying a hydrophobic liquid of lower specific gravity is disclosed and comprises providing a measuring device comprising a first material that changes appearance upon exposure to a first fluid, such as an aqueous fluid, introducing the measuring device into a location comprising the first fluid and at least one other fluid such as a hydrophobic fluid, waiting for the first material to change appearance upon exposure to the first fluid, and withdrawing the measuring device from the location to determine the depth of the first fluid and the at least one other fluid. A measuring device for performing the method of measuring is also disclosed.

BRIEF DESCRIPTION OF THE DRAWINGS

FIG. 1 illustrates one embodiment of a measuring device of the present invention.

FIGS. 2A-2C illustrate various embodiments of weighted sections of a measuring device.

FIGS. 3A-3C illustrate a method of performing a measurement using the measuring device of the invention.

FIG. 4 illustrates a sample package including an embodiment of the device of the invention.

DETAILED DESCRIPTION OF THE PREFERRED EMBODIMENTS

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 illustrates a measuring device 100 preferably comprising a strip 100 of paper having a free end 110, a first side 120 and a second side 130 opposite the first side 120. The strip is preferably manufactured and provided in rolls of varying sizes in the nature of a tape reel, with the free end portion shown only here for purposes of convenience. For example, in one embodiment the strip of material might be supplied in rolls that are longer than five hundred feet. Perforations 140 may be provided at spaced apart locations to section the strip into discrete lengths as desired by the end user. Measurement indicators in the form of notches 150, 160 or the like are provided along the sides 120, 130 to assist in the measurement of a depth of fluid relative to the free end 110, with such notches functioning like a ruler preferably with different scales on each side. Specifically, notches 150 along side 120 are provided, for example, at one-inch increments, while notches 160 along side 130 are provided, for example, at six-inch increments to provide a greater scale. While notches 150, 160 are shown, it will be appreciated that other measurement indicators could be used, such as simple printed markings as is known on a rule, for example, or other methods known in the art. In addition, while a strip of paper of certain dimensions is shown, it will be appreciated that carriers of other dimensions and configurations are contemplated.

The strip 100 is preferably coated or otherwise provided with a non-toxic material 170 that changes appearance or property in the presence of an aqueous fluid such as free or un-dissolved water. One example of such a material is a fluorescent dye that exhibits fluorescence upon exposure to aqueous fluid. A number of dyes will satisfy this functionality, although only certain dyes may be currently economically feasible in manufacture and use. Two non-limiting examples include fluorescein and rhodamine. For purposes of explanation, the present discussion will be limited to fluorescein, with the understanding that other materials are possible, and such material shall be referred to as coating 170. Fluorescein is an orange-red powdered compound, molecular formula $C_{20}H_{12}O_5$, that exhibits intense greenish-yellow fluorescence in alkaline solution. Its disodium salt is marketed under the trademark "Uranine," and is also known as D&C Yellow no. 8. Fluorescein is a fluorophore commonly used in dye tracing, and is also known as a color additive (D&C Yellow no. 7). Fluorescein has an absorption maximum at 490 nm and emission maximum of 514 nm (in water). Also, fluorescein has an isoabsorptive point (equal absorption for all pH values) at 460 nm. One of its more recognizable uses was in the Chicago River, where fluorescein was the first substance used to dye the river green on St. Patrick's Day in 1962. Other uses of fluorescein include using it as a water-soluble dye added to rainwater in environmental testing simulations to aid in locating and analyzing any water leaks. Thus, initially, the strip 100 with coating 170 may appear to have an orange-red coloring on one or both sides of the strip 100.

The free end 110 of the strip 100 is preferably weighted in some fashion so that the strip 100 can be lowered into a testing environment and held straight during use. FIGS. 2A-2C illustrate various non-limiting weighting options, such as a clip 200*a* or the like attached to the free end 110*a* (FIG. 2A), or a mass 200*b* attached to an eyelet 112*b* in the free end 110*b* (FIG. 2B), or a weighted section 200*c* integrally manufactured into the free end 110*c* (FIG. 2C). Other weighting options are contemplated. Also contemplated is a strip formed from a more rigid material that remains straight when held upright without any ancillary weights. A typical example of a mass 200*b* might be a two-ounce mass of metal such as copper, brass, steel, or an alloy of the same, for example. Other metallic and non-metallic weighting materials are contemplated.

FIGS. 3A-3C illustrate one example or method of using the measuring strip 100 to determine the depth of an aqueous liquid 320, such as free, un-dissolved water for example, underlying a hydrophobic liquid of lower specific gravity 310, such as oil for example, in a contained environment 300 having a bottom 305, such as an underground containment vault for example. While only two liquids are shown here, it will be understood that additional liquids could be present in a testing environment, such as additional layers of hydrophobic materials on top of an aqueous layer. For the purposes of measurement in deep vaults, for example, a ten foot length of strip material 100 might be selected. In order to insure the strip 100 would remain straight while being lowered into the vault 300, a small weight 200*b* (see FIG. 2B) is attached to the free end 110. For ease of use a small length of string 115 (FIG. 3B) is attached to the end opposite the free end 110. The strip 100 is lowered into the vault 300 until the user feels the weight 200*b* touching the bottom 305 of the vault 300 (FIG. 3B). Insertion of the strip 100 into water 320 with oil 310 floating on top will initially coat the entire submerged portion of the strip 100 with oil 310 as it is passed through the oil 310 and into the water 320. After about five seconds or the like, the coating 170, which is preferably initially orange-red in color, will turn fluorescent yellow 330 after a sufficient time for the water 320 to penetrate the oil coating on the strip 100. The oil 310 above the water 320 will soak into the strip 110 and merely darken the orange-red-colored strip portion 350 (FIG. 3C) and not fluoresce yellow giving a clear indication of the depth of the oil 350 relative to the depth of the water 340. After the user removes the strip 100 (FIG. 3C) and inspects the same, the user will appreciate the depth of the water 340 as well as the depth of the oil 350 residing on top of the water in the vault 300 by counting the notches 150, 160 or with reference to other measurement guides as the case may be.

FIG. 4 illustrates one method of packaging a measurement device for commercial distribution comprising a package 400 including a coil of strip 100, a desiccant 410 and preferably a weight 420. Due to the reactive nature of the coating 170 applied to the strip 100, the package is preferably purged with nitrogen to keep dry and hermetically sealed with a hot bar sealer or the like. Various coil lengths can be vended to address different applications. While one application has been shown and described where it is desired to have a ten-foot strip, for example, it will be appreciated that other applications are contemplated where it is desired to measure, for example, the depth of oil floating on water. One application is the quick inspection and measurement of oil in the hulls of ships. For this requirement, longer lengths of strip may be attached to a fixed or adjustable length pole or stick for insertion into a tank, in which case the coil strip might be much longer. Another may be for use by contractors in the field who may be working in an area that has pools of fluid containing water and oil and the presence and depth of oil may be required. For this application, short strips (nominally two-three feet) can be used for a quick measurement of the depth of oil or other hydrophobic media to aid in the determination of remediation required to remove the fluid. Additional lengths are also contemplated.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method of measuring a fluid level comprising:
 a) providing a measuring device comprising a first material that changes appearance upon exposure to a first fluid;
 b) introducing the measuring device into a location comprising the first fluid and at least one other fluid;
 c) waiting for the first material to change appearance upon exposure to the first fluid; and
 d) withdrawing the measuring device from the location;
 e) wherein the first fluid is an aqueous fluid, and the first material is a fluorescent dye that exhibits fluorescence upon exposure to the aqueous fluid.

2. The method of claim 1, wherein the at least one other fluid is a hydrophobic fluid.

3. The method of claim 1, wherein the fluorescent dye further comprises fluorescein.

4. The method of claim 1, wherein the measuring device further comprises at least one measurement indicator for assisting in the measurement of a level of the first fluid in a location.

5. The method of claim 2, wherein the hydrophobic fluid has a lower specific gravity than the first fluid.

6. The method of claim 5, wherein the hydrophobic fluid is oil.

7. The method of claim 6, wherein the first material changes color upon exposure to the first fluid.

8. A method of measuring the depth of an aqueous liquid underlying a hydrophobic liquid of lower specific gravity in a contained location comprising:
 a) providing a measuring device comprising a first material that changes appearance upon exposure to an aqueous liquid but that does not change appearance upon exposure to a hydrophobic liquid, the measuring device further comprising a weighted free end;
 b) introducing the measuring device into the contained location until the weighted free end passes through a layer of hydrophobic liquid, then a layer of aqueous liquid, and then reaches a bottom of the contained location;
 c) waiting for the first material to change appearance upon exposure to the aqueous liquid;
 d) withdrawing the measuring device from the contained location; and e) determining the depth of the aqueous liquid underlying the hydrophobic liquid by measuring the amount of the first material that changed appearance relative to the amount of the first material that was exposed to the hydrophobic liquid and not exposed to the aqueous liquid;

f) wherein the first material is a fluorescent dye that exhibits fluorescence upon exposure to the aqueous fluid.

9. The method of claim 8, wherein the fluorescent dye further comprises fluorescein.

10. The method of claim 8, wherein the measuring device further comprises at least one measurement indicator for assisting in the measurement of a level of the first fluid in a location.

11. A measuring device for measuring a fluid depth level comprising:
   a) a first material having a free end;
   b) a first weight for attachment to the free end;
   c) at least one measurement indicator for assisting in the measurement of a depth level of the aqueous fluid in a location;
   d) wherein upon introduction of the measuring device into a location comprising a depth of aqueous liquid underlying a hydrophobic liquid of lower specific gravity, the first material changes appearance upon exposure to the aqueous material, but not upon exposure to the hydrophobic fluid, such that the depth of the aqueous liquid underlying the hydrophobic liquid can be measured by measuring the amount of the aqueous material that changed appearance relative to the amount of the first material that was exposed to the hydrophobic liquid and not exposed to the aqueous liquid;
   e) wherein the first material is a strip of paper comprising a fluorescent dye that exhibits fluorescence upon exposure to the aqueous fluid.

12. The measuring device of claim 11, wherein the fluorescent dye further comprises the compound $C_{20}H_{12}O_5$.

13. The measuring device of claim 11, wherein the at least one measurement indicator further comprises spaced-apart notches on at least a first side of the first material.

14. The measuring device of claim 11, wherein the first weight further comprises at least a two-ounce metallic mass.

15. The measuring device of claim 13, wherein the at least one measurement indicator further comprises spaced-apart notches on opposite sides of the first material, each side comprising a different spacing between notches.

16. The measuring device of claim 15, wherein notches are provided at one-inch increments on one side, and at six-inch increments on the opposite side.

17. The measuring device of claim 14, further comprising an eyelet provided near the free end for attachment of the first weight.

18. The measuring device of claim 17, wherein the mass further comprises copper, brass, or steel or an alloy of the same.

* * * * *